April 10, 1951 P. A. NOXON 2,548,555
DEVICE FOR INTRODUCING MOTION INTO SEALED CASINGS
Filed July 2, 1945 3 Sheets-Sheet 1

Inventor
Paul A. Noxon.
By C. J. Talman
Attorney

April 10, 1951 P. A. NOXON 2,548,555
DEVICE FOR INTRODUCING MOTION INTO SEALED CASINGS
Filed July 2, 1945 3 Sheets-Sheet 2

Inventor
Paul A. Noxon
By
C. J. Talman
Attorney

April 10, 1951  P. A. NOXON  2,548,555
DEVICE FOR INTRODUCING MOTION INTO SEALED CASINGS
Filed July 2, 1945  3 Sheets—Sheet 3

Inventor
Paul A. Noxon
By
C. J. Talman
Attorney

Patented Apr. 10, 1951

2,548,555

UNITED STATES PATENT OFFICE 2,548,555

DEVICE FOR INTRODUCING MOTION INTO SEALED CASINGS

Paul A. Noxon, Tenafly, N. J., assignor to Bendix Aviation Corporation, Teterboro, N. J., a corporation of Delaware Application July 2, 1945, Serial No. 602,856

3 Claims. (Cl. 74—86)

The present invention relates to novel motion transmitting means adapted for the introduction of rotary movement from an external source into a sealed casing without impairing the seal, and more particularly to an application of such novel motion transmitting means to magnetic compasses of the type having a course-reminding secondary compass card within the compass bowl, whereby said secondary compass card may be readily adjusted from the exterior of the compass bowl.

One of the objects of the invention is to provide novel means for transmitting rotary motion to a rotary member within a sealed casing from an external member without impairing the seal.

Another object of the present invention is to provide in a magnetic compass a course-setting means having a novel construction including the provision of a secondary compass card, which may be manually set at any time by the operator, in order to provide a desired course reminder.

A further object is to provide in a magnetic compass of the type having a liquid-filled bowl, a novel course-reminding secondary compass card which is substantially coaxially arranged with respect to the main compass card, and which may be readily adjusted to any desired position by mechanism actuated exteriorly of the compass.

Another object is to provide in a magnetic compass of the above type, a novel arrangement for adjusting the secondary compass card from a point without the compass, without the necessity of employing any packing glands or rotary shaft seats.

Still another object resides in the provision of a novel motion transmitting mechanism for adjusting the secondary compass card from without the compass bowl and which includes a lever or shaft capable of oscillatable movement about a fixed pivot, thus dispensing with the necessity of using packing glands or other type of rotating shaft seals which are subject to leakage difficulties.

A still further object includes the provision of a relatively simple but extremely effective construction for adjusting the secondary compass card which comprises relatively few parts, so arranged as to avoid any possibility of leakage of liquid from the compass bowl.

Other objects and novel features of the invention will appear more fully hereinafter from a consideration of the following detailed description when taken in connection with the accompanying drawings which are illustrative of the invention. It is to be expressly understood, however, that the drawings are utilized for purposes of illustration only and are not designed as a definition of the limits of the invention, reference being had for this purpose to the appended claims.

In the drawings wherein similar reference characters refer to similar parts throughout the several views.

Figure 1:
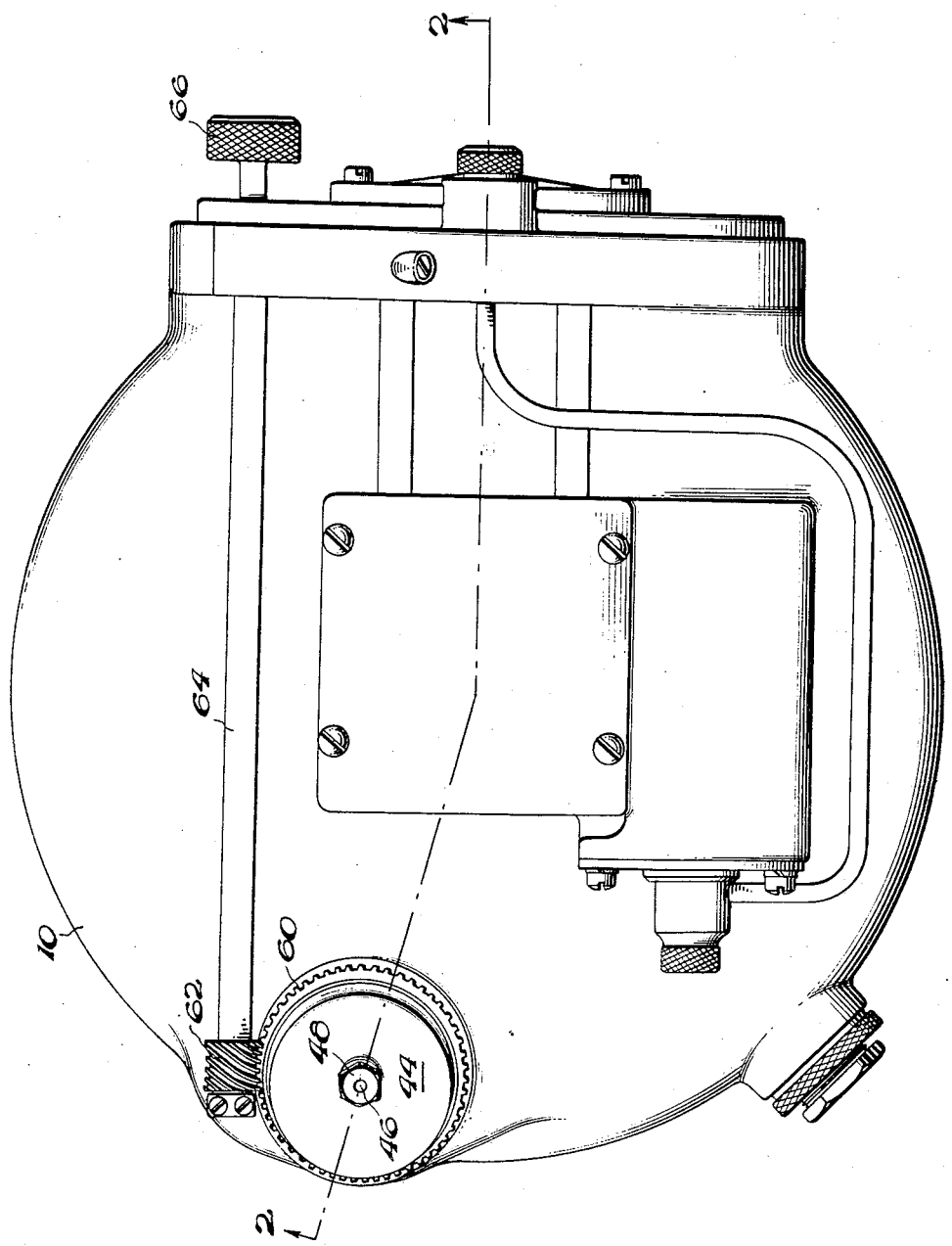
Figure 1 is a top view of a compass embodying the principles of the present invention.
Figure 3:
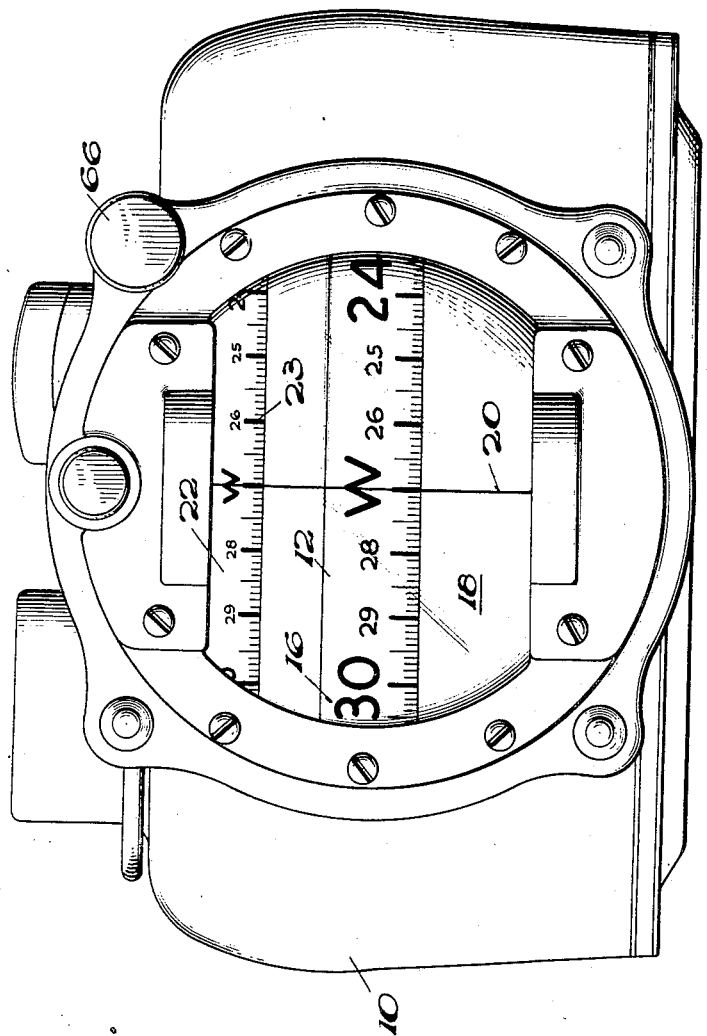
Figure 3 is a front view of the compass illustrating the arrangement of the main and secondary compass cards within the compass bowl.

Referring more particularly to Figures 1 and 3, a magnetic compass embodying the principles of the present invention is illustrated therein as comprising a liquid-filled compass bowl or casing 10 containing a main compass card 12 having conventional magnets 9 attached thereto. Card 12 may be pivotally mounted on a support 14 and is adapted to indicate the direction of the earth's magnetic field in a well-known manner. The usual indicia 16 are provided on the surface of the card which may be viewed from the exterior through a cover-glass 18 having a lubber line 20 thereon.

A novel arrangement is employed in the present invention for providing in connection with the compass above described, a course reminder which may be simultaneously observable through the cover-glass 18 by the operator in order that maintenance of the described course may be facilitated. As shown, such course reminder is constituted by a secondary or course-reminding compass card 22 which is rotatably mounted in the top of the casing 10 as by a screw 24, the arrangement being such that the two cards 12 and 22 are substantially coaxial. Here again, the exterior surface of the secondary card 22 is provided with the usual indicia 23 which may be viewed simultaneously with the indicia 16 of the main card 12 through the cover glass 18, as clearly shown in Figure 3.

Figure 2:
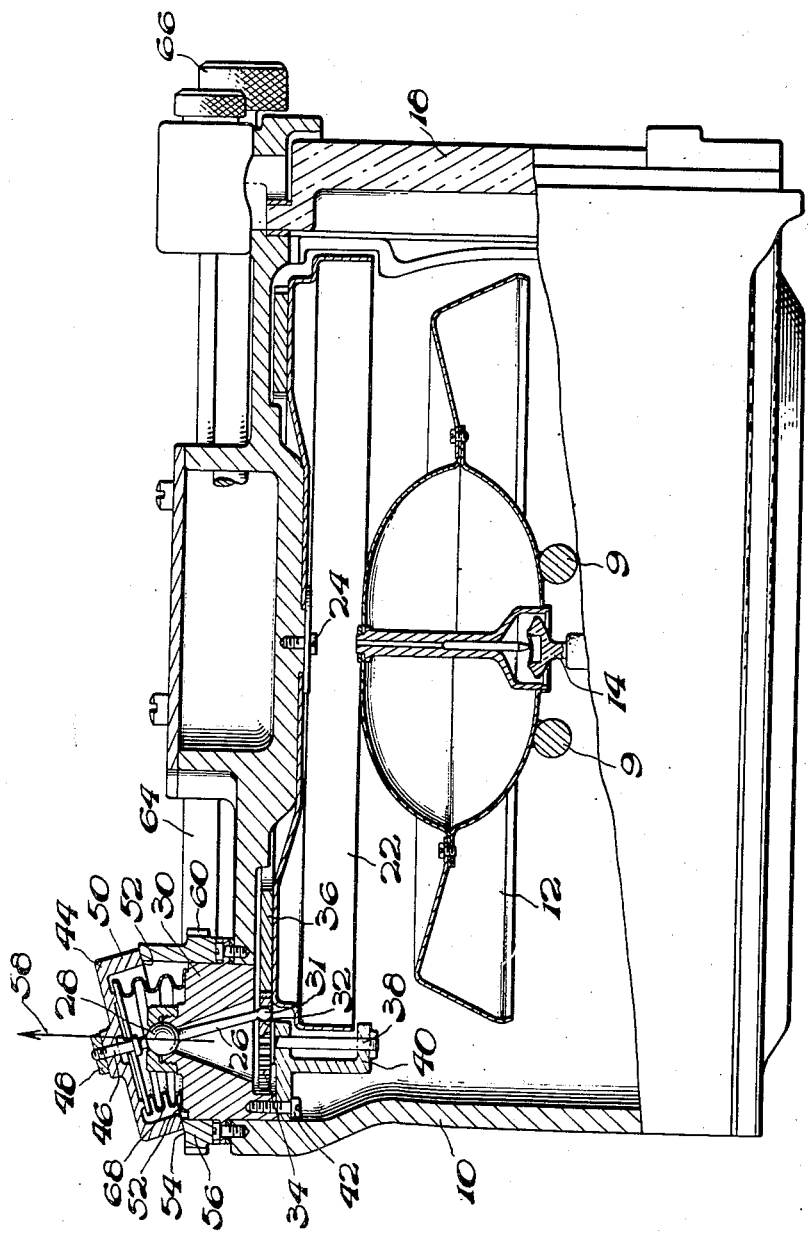
Figure 2 is a side view partly in section of the compass of Figure 1, and taken substantially along lines 2—2 of Figure 1.

In order that the secondary compass card may be adjustably positioned with respect to the casing 10 for the purpose of securing any desired setting of a selected course, the present invention provides a novel arrangement for achieving such a result, and preferably such arrangement includes a construction which avoids the use of any packing glands or rotary shaft seals. More particularly, the adjusting arrangement includes a lever or rod 26 (Figure 2) which is provided intermediate its ends with a ball and socket mounting 28 in a supporting block 30. The lower portion of the lever 26 is provided with a ball shaped end 31 which is adapted to be received within an opening 32 adjacent the periphery of a pinion gear 34, the latter being in constant meshing engagement with a ring gear 36 which is fixedly mounted on the secondary compass card 22. As shown, pinion 34 is carried by a shaft 38 which is mounted upon a bracket 40, secured to the block 30 as by a screw 42. With such a construction, it will be readily apparent that should the lever 26 be moved in such a manner that the lower end 31 describes a circle, pinion 34 will be rotated about the shaft 38 and will, in turn, rotate the gear 36 and cause adjusting movement of the secondary compass card 22.

Means are provided for causing the above-described motion of the lever 26, and in the form shown, such means includes a cap 44 which is secured to the upper end 46 of the lever 26 as by means of a nut 48, and which is provided with a flanged rim 50 having its lower surface 52 in sliding engagement with a plane cam surface 54 of an adjusting pinion 56, such surface being directed angularly with respect to the axis 58 of the pinion. The latter is provided with a peripheral teeth 60 in constant meshing engagement with a suitable driving gear 62 (Figure 1) carried by a shaft 64 and rotatable from the front of the compass, as by a knob 66, the construction being such that a convenient and readily accessible adjustment is afforded for setting the secondary card to any desired position of adjustment.

In order to avoid any possibility of leakage of the liquid within the compass bowl past the ball and socket mounting 28 to the exterior, a novel sealing means is associated with the lever 26 which avoids the use of any packing glands or rotary shaft seals. As shown, such means includes a flexible metal bellows 68, soldered or brazed at one end to the block 30, and suitably secured at its opposite end to the end 46 of the lever 26, all the connections being such that a liquid tight seal is secured.

In operation, and considering that the parts have been assembled as heretofore described, it will be understood that the operation of the main compass card 12 in order to indicate compass direction is similar to devices of this character which are well-known in the art. In the event it is desired to set the secondary compass card for any desired heading, it is only necessary to rotate knob 66 in the desired direction whereupon the gear 36 and secondary card 22 will be moved to the desired new position through the operation of the lever 26 and parts cooperating therewith.

More particularly, it will be apparent that as the pinion 56 is rotated by the shaft 64 and gear 62, the cap 44 and the upper portion 46 of the shaft 26 will progressively assume different positions about the vertical axis 58, all of such positions, however, being disposed at a constant angle with respect to the said axis 58. This action is due to the cooperation between the angularly directed surfaces 52 and 54 and to the fact that the cap 44 is secured to the portion 46 of the lever 26, it being observed that during rotation of the pinion 56, the cap 44 does not rotate but partakes of a rocking motion to cause the upper end 46 of the lever 26 to describe a circle about the axis 58. The lower end 31 of the lever 26 likewise moves in a circle about the axis 58 and thus adjusts the position of the secondary compass card 22 through the cooperation of the pinion 34 and gear 36.

It will be particularly noted from the foregoing that neither the cap 44 nor the shaft 26 is rotated about their axes during the adjusting operation. Hence, the flexible metal bellows 68 is merely expanded and contracted as the setting operation is accomplished and thus the use of packing glands and rotary shaft seals, with their attendant leakage difficulties, is entirely eliminated.

There is thus provided by the present invention a novel and relatively simple arrangement for securing a course reminder within a compass bowl of the type adapted to be filled with liquid, and for adjusting the same from a point exteriorly of the bowl without requiring the use of packing glands or rotary shaft seals. The construction is positive in operation, comprises relatively few parts, and is capable of manufacture at relatively low cost.

While one embodiment of the invention has been set forth herein, it will be obvious that the same is not limited hereto but may be embodied in other forms, as will be apparent to those skilled in the art. For example, while the cap 44 has been shown as secured to the end 46 of the lever 26, so that during rotation of the pinion 56, relative rotation will take place between the pinion and cap, it will be understood that if desired, the cap 44 may be sleeved on lever portion 46, in which event the cap 44 and pinion 56 may rotate as a unit. However, the action of the shaft 26 will be precisely the same as in the other form, and will not be subject to any rotation about its axis. Various other changes may also be resorted to without departing from the spirit of the invention, the limits of which are defined by the appended claims.

What is claimed is:

1. A device for transmitting rotary motion to a rotary member within a sealed casing from an external member, comprising an insert having a tapered opening therein and adapted to be hermetically sealed to a casing, a hollow member surrounding said insert and having its upper end formed to provide an inclined surface, a rockable cap bearing with its open end on the inclined surface of said hollow member for rocking movement about an axis passing through the center of said cap and perpendicular to the plane of said inclined surface, a flexible bellows in said cap having one end attached to the interior of said cap and the other end to said insert, and a lever pivoted intermediate its ends in said insert and having one end attached to the head of said cap and its other end projecting through said tapered opening for operating a rotary member in a sealed casing.

2. A device for transmitting rotary motion to a rotary member within a sealed casing from an external member, comprising an insert having a tapered opening therein and adapted to be hermetically sealed to said casing, means comprising a hollow cap covering said tapered opening and mounted by way of its open end for movement relative to said insert, a flexible bellows in said cap having one end closed and the other end open and attached to said insert around said opening and sealed to said insert, and means including a member having one end thereof attached to the closed end of said bellows and its other end projecting through said tapered opening for operating a rotary member in a sealed casing.

3. A device for transmitting rotary motion to a rotary member within a sealed casing from an external member, comprising an insert having an opening therein and adapted to be hermetically sealed to said casing, means comprising a hollow cap covering said opening and mounted by way of its open end for movement relative to said insert, a flexible bellows in said cap having one end closed and the other end open and attached to said insert around said opening and sealed to said insert, and means including a member having one end thereof attached to the closed end of said bellows and its other end projecting through said opening for operating a rotary member in said casing.

PAUL A. NOXON.

REFERENCES CITED

The following references are of record in the file of this patent:

UNITED STATES PATENTS

| Number | Name | Date |
|---|---|---|
| 526,413 | Rushton | Sept. 25, 1894 |
| 1,148,227 | Heeley | July 27, 1915 |
| 1,378,118 | Jacobsen et al. | May 17, 1921 |
| 1,737,487 | Wunsch | Nov. 26, 1929 |
| 2,014,024 | Leatherman | Sept. 10, 1935 |
| 2,046,477 | Ohmart | July 7, 1936 |
| 2,107,090 | Swennes | Feb. 1, 1938 |
| 2,108,263 | L'Abee-Lund | Feb. 15, 1938 |
| 2,395,843 | Brown | Mar. 5, 1946 |